Oct. 12, 1943.   H. O. TOLLEFSON   2,331,816
SAFETY HITCH
Filed Jan. 9, 1943

Henning O. Tollefson INVENTOR.

BY
*Victor J. Evans & Co.*

ATTORNEYS

Patented Oct. 12, 1943

2,331,816

UNITED STATES PATENT OFFICE 2,331,816

SAFETY HITCH

Henning O. Tollefson, Bottineau, N. Dak.

Application January 9, 1943, Serial No. 471,867

6 Claims. (Cl. 24—241)

My invention relates to fastening devices analogous to snaps, and has among its objects and advantages the provision of an improved safety hitch.

Figure 1:
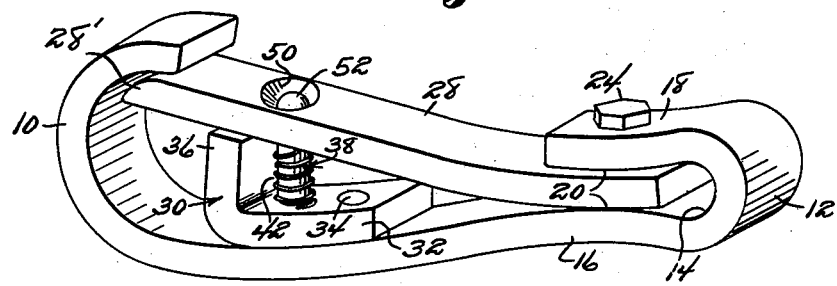
Figure 1 is a perspective view of the hitch.
Figure 2:
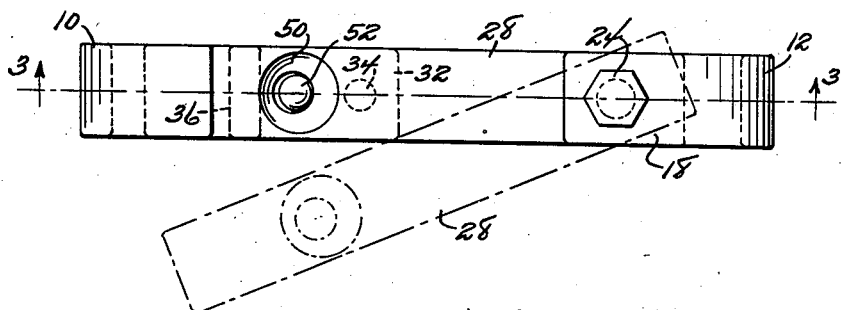
Figure 2 is a face view.

In the embodiment of the invention selected for illustration, I make use of a piece of strap metal bent at one end to provide a hook 10. The other end of the strap is bent back upon itself at 12 to provide a loop 14 for connection with lines, chains or other types of work or devices. Both the shank 16 and the end margin 18 are bowed inwardly in a slight amount, as at 20.

Coaxial openings 22 are provided in the shank 16 and the margin 18 for the reception of a bolt 24. This bolt fits loosely in an opening 26 in one end of a metal strap tongue 28, which fits loosely between the bowed surfaces 20. The other end of the tongue extends inside the hook 10 and is rounded at 28' to bring the end into close proximity with the hook, particularly the inner face of the tongue, to nearly close the space between the inner face of the tongue and the hook, so that both large and small devices may be latched in the hook.

A strap angle 30 has its leg 32 riveted at 34 to the shank 16, with its leg 36 extending laterally of the shank to constitute a stop for the tongue, thereby preventing the tongue from being pushed inwardly of the hook, although the tongue may move freely about the axis of the bolt 24 so far as the leg 36 is concerned. The two ends of the rivet 34 are respectively countersunk in the shank 16 and the leg 32 to eliminate projections.

A latch pin 38 is slidably guided in coaxial openings 40 in the shank 16 and the leg 32. A compression spring 42 is mounted on the pin 38, with one end of the spring resting on the leg 32 and its other end anchored in an opening 44 in the pin so that the latter is yieldingly held in the position of Figure 3.

Figure 3:
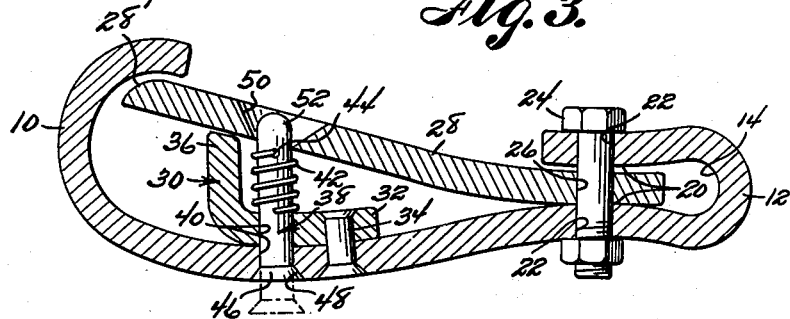
Figure 3 is a sectional view along the line 3—3 of Figure 2.

The head 46 of the pin 38 is receivable in a recess 48 in the shank 16 to lie flush therewith and to limit the spring projected position of the pin beyond that shown in Figure 3.

A tapered opening 50 is provided in the tongue 28 for the reception of the rounded end 52 of the pin 38. This end extends sufficiently far into the opening 50 to effectively latch the tongue 28 against accidental pivotal movement about the bolt 24. The large end of the opening 50 intersects the outer face of the tongue so that the pin 38 may be retracted by inserting the thumb into the opening to press the pin out of holding relationship with the tongue.

Because of the rounded end 52, this end need not be depressed entirely beneath the inner face of the tongue, since lateral pressure on the tongue after slight retraction of the pin brings the tongue into camming engagement with the rounded end to depress the pin and permit the tongue to swing to one side of the hook, thereby fully opening the hook. The end 52 lies beneath the outer face of the tongue in the fully projected position of the bolt so that the pin cannot be accidentally retracted out of latching engagement with the tongue. Slight retraction of the pin permits the tongue to be swung to the position of Figure 3.

The leg 36 comprises a sturdy stop for the tongue to prevent the latter from being moved toward the shank 16, even though great pressure is exerted on the tongue. The three strap parts of the safety latch are easily bent from metal straps, and the hitch is easily manipulated and is durable, in addition to incorporating a safety feature which prevents accidental opening of the hook. In locating the latch pin 38 near the hook 10, the hitch may be held firmly in the hand for coupling and uncoupling purposes, but with the pin easily accessible by the thumb of the hand.

Without further elaboration, the foregoing will so fully explain my invention, that others may, by applying current knowledge, readily adapt the same for use under various conditions of service.

I claim:

1. A safety hitch comprising a first member bent at one end to provide a hook and bent back upon itself at the other end to provide a loop and an end margin overlying the first member but spaced therefrom, a tongue member having one end lying between the first member and said end margin and pivotally connected therewith for pivotal movement laterally of the hook, said tongue member being of such length as to extend inside the hook adjacent the end thereof, a support attached to said first member and underlying said tongue member to restrain the latter from movement toward the first member, and a retractable latch means carried by said first member and engageable with said tongue member near said hook to restrain the tongue member from accidental pivotal movement about its pivotal axis.

2. The invention described in claim 1 wherein said first member, said tongue member and said support respectively comprise metallic straps.

3. A safety latch comprising a first member having a hook at one end and a loop at the other end, a tongue having one end lying inside said hook, a pivotal connection between the other end of the tongue and the first member and said loop, with the axis of the pivotal connection lying in the plane of the hook, a tongue support attached to the first member and underlying the tongue, said tongue having an opening, and a spring pressed latch pin carried by said first member and normally extending into said opening to latch the tongue from accidental pivotal movement about the axis of said pivotal connection.

4. The invention described in claim 3 wherein said opening is flared to a finger receiving proportion at the outer face of the tongue, and in which the latch pin has a cam shaped end engageable with the tongue when the latch pin is partly depressed to depress the latch pin out of holding engagement with the tongue upon pivotal movement of the tongue.

5. The invention described in claim 3 wherein said pivotal connection comprises a bolt extending through said first member and the loop and losely through said tongue.

6. The invention described in claim 3 wherein said first member, said tongue and said stop respectively, comprise metal straps, in which said strap is bent to angle contour, with one leg fixed to the first member and its other leg extending up to the tongue near said hook, and in which one end of said spring is rested on one of said legs and having its other end attached to said pin.

HENNING O. TOLLEFSON.